Jan. 18, 1938.  J. R. DAVIS  2,105,780
INTERNAL COMBUSTION ENGINE
Filed Oct. 6, 1933  10 Sheets-Sheet 1
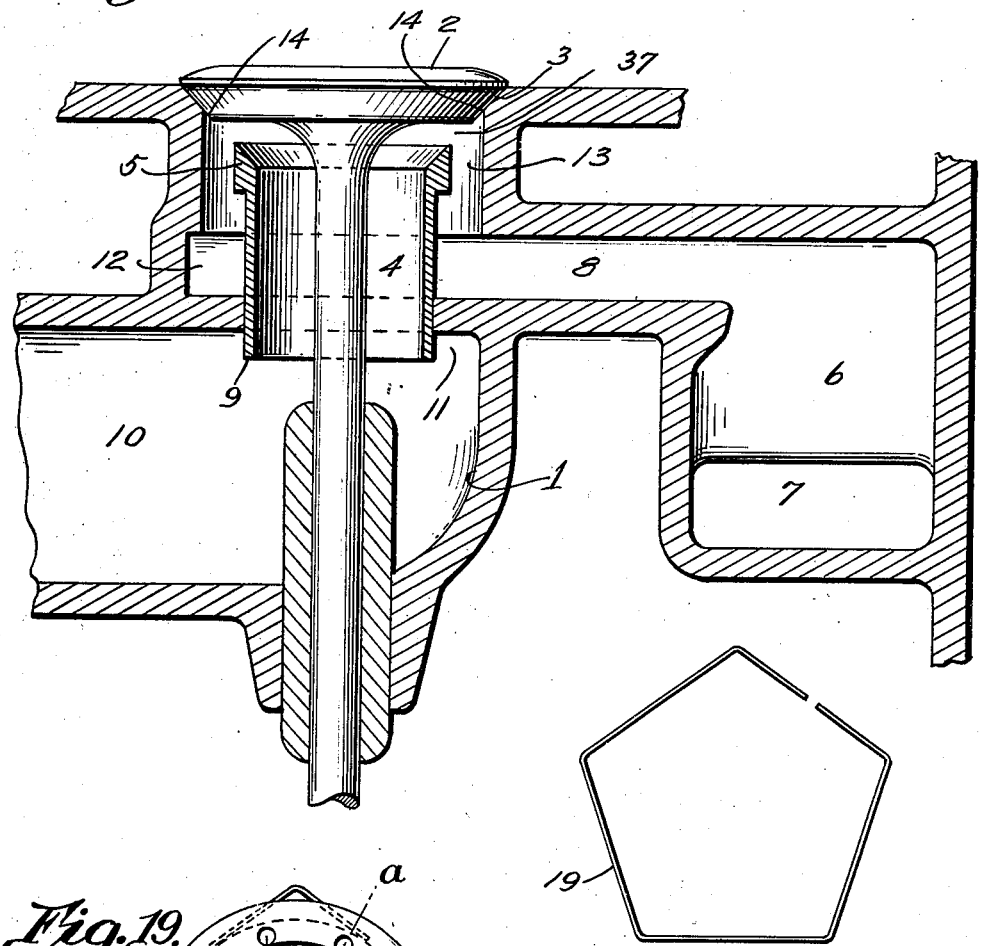
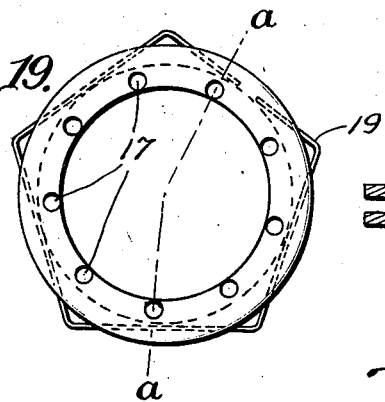
Inventor
Joseph Rex Davis
By
Attorney Jan. 18, 1938.   J. R. DAVIS   2,105,780
INTERNAL COMBUSTION ENGINE
Filed Oct. 6, 1933   10 Sheets-Sheet 2
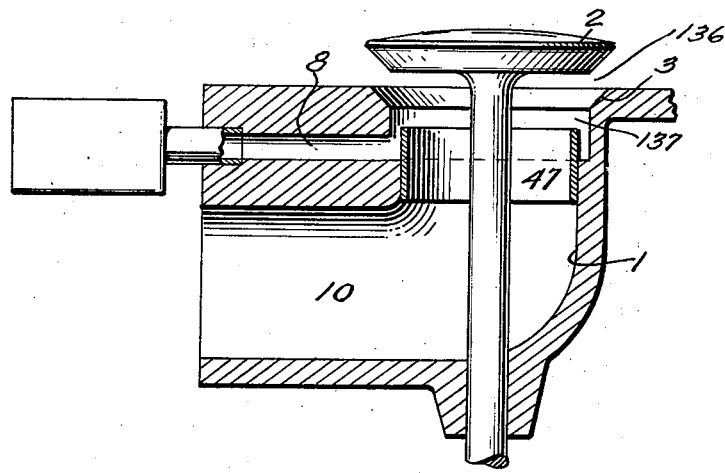
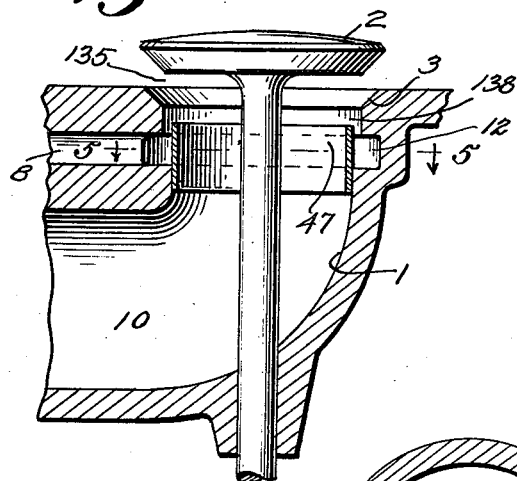
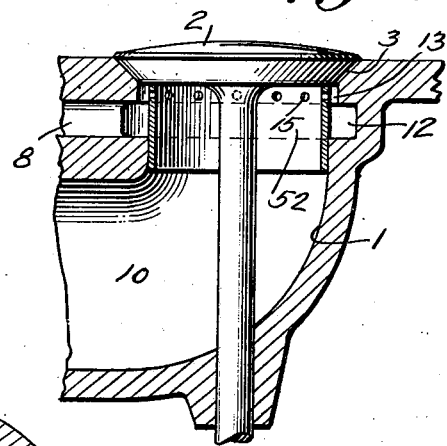
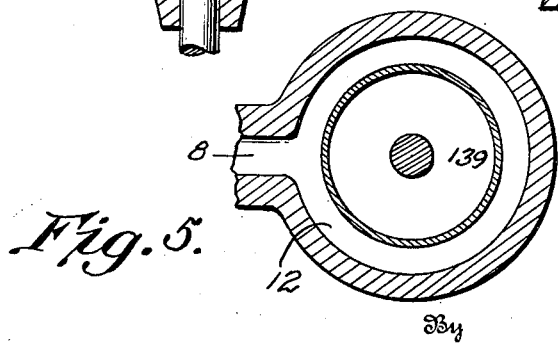
Inventor
Joseph Max Davis
By
Attorney Jan. 18, 1938.   J. R. DAVIS   2,105,780
INTERNAL COMBUSTION ENGINE
Filed Oct. 6, 1933    10 Sheets-Sheet 3
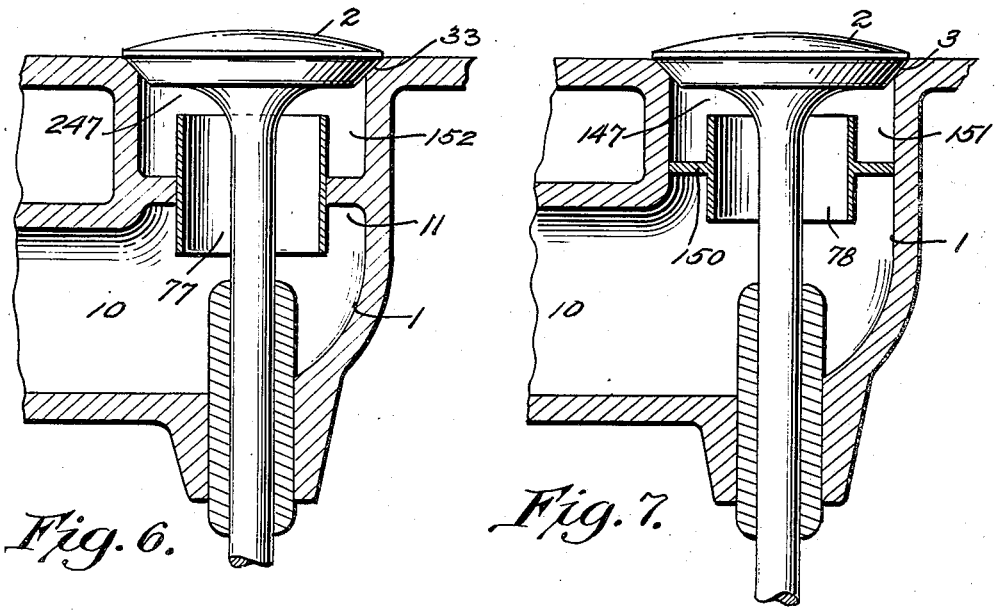
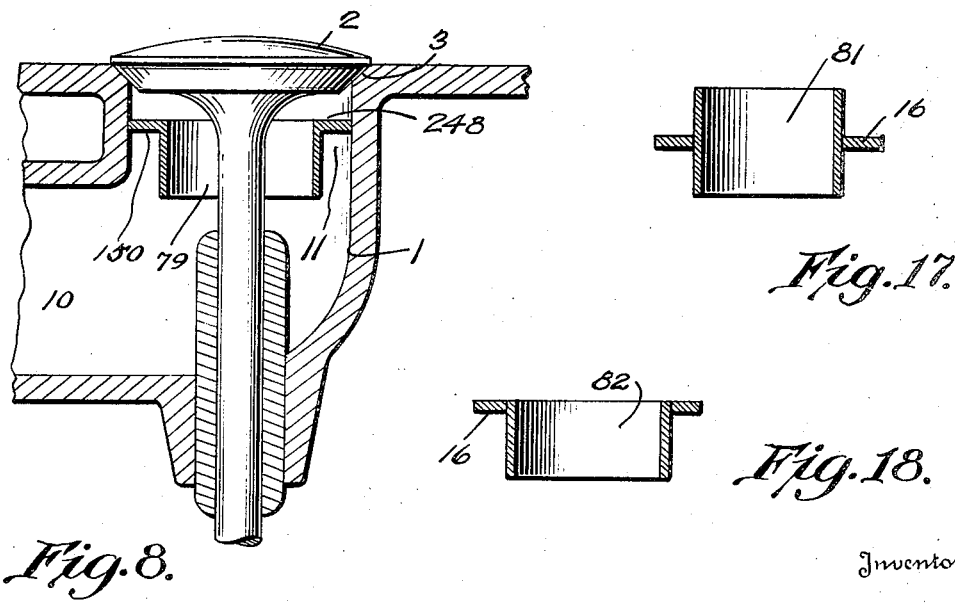
Inventor
Joseph Rex Davis
By
Attorney Jan. 18, 1938.   J. R. DAVIS   2,105,780
INTERNAL COMBUSTION ENGINE
Filed Oct. 6, 1933   10 Sheets-Sheet 4
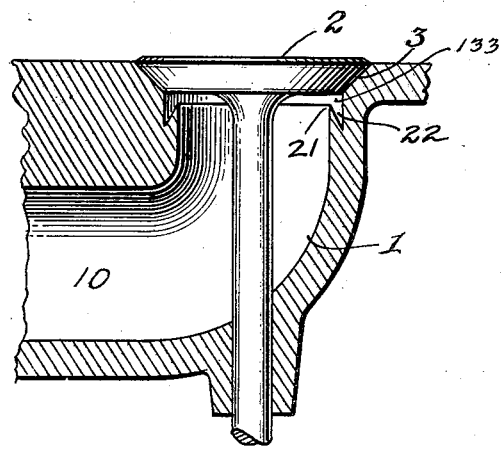
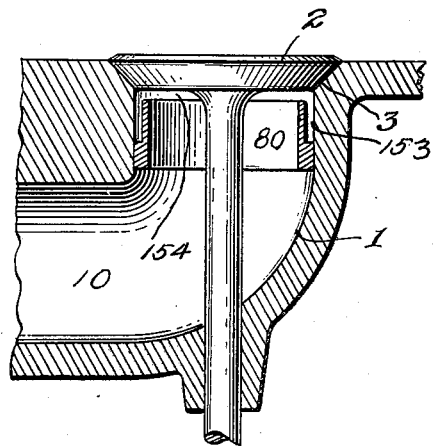
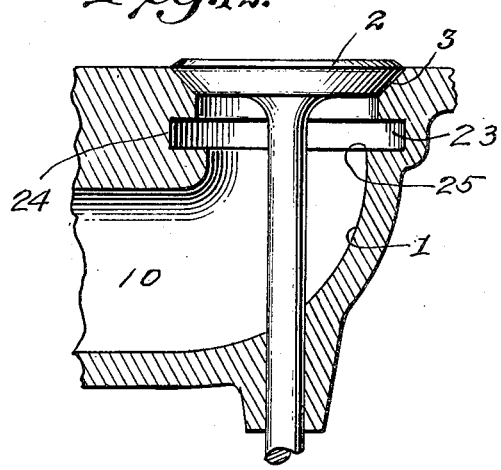
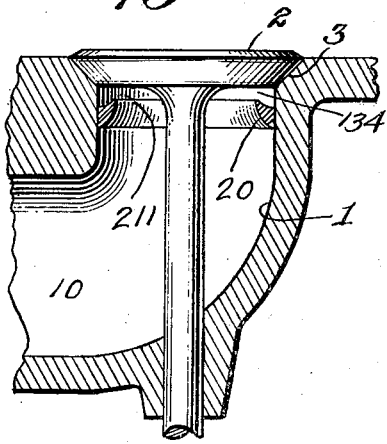
Inventor
Joseph Rex Davis
By
Attorneys Jan. 18, 1938. J. R. DAVIS 2,105,780
INTERNAL COMBUSTION ENGINE
Filed Oct. 6, 1933 10 Sheets-Sheet 5
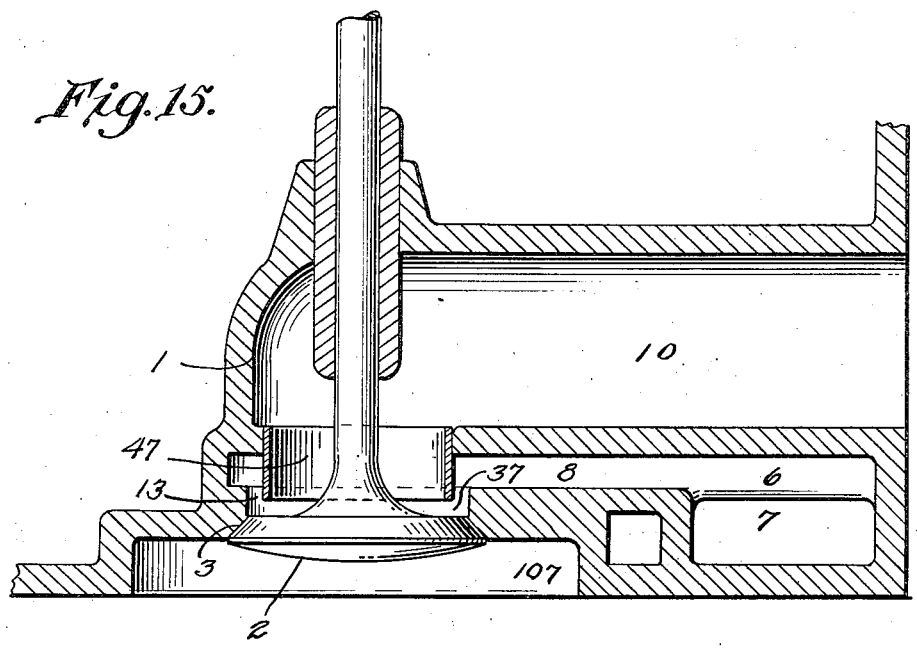
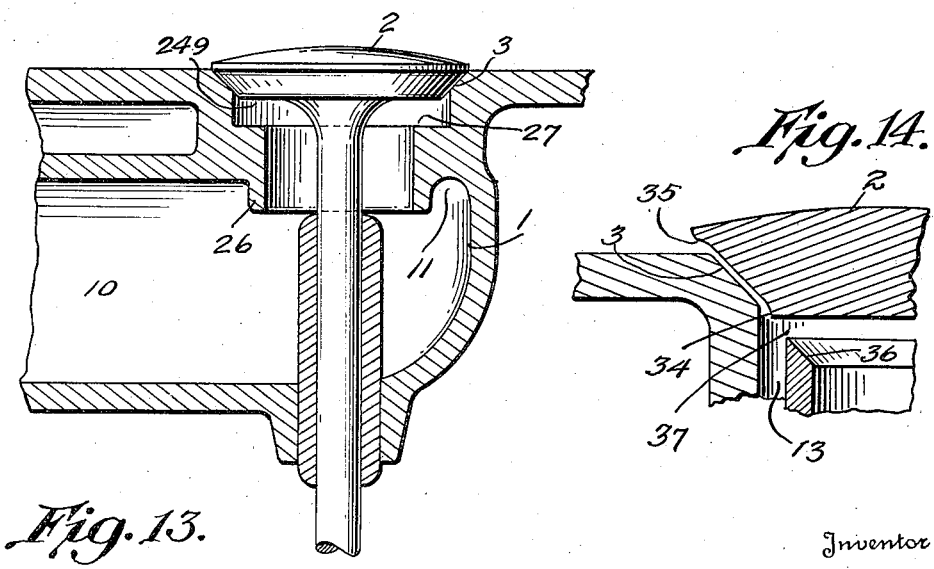
Inventor
Joseph Rex Davis
By
Attorney

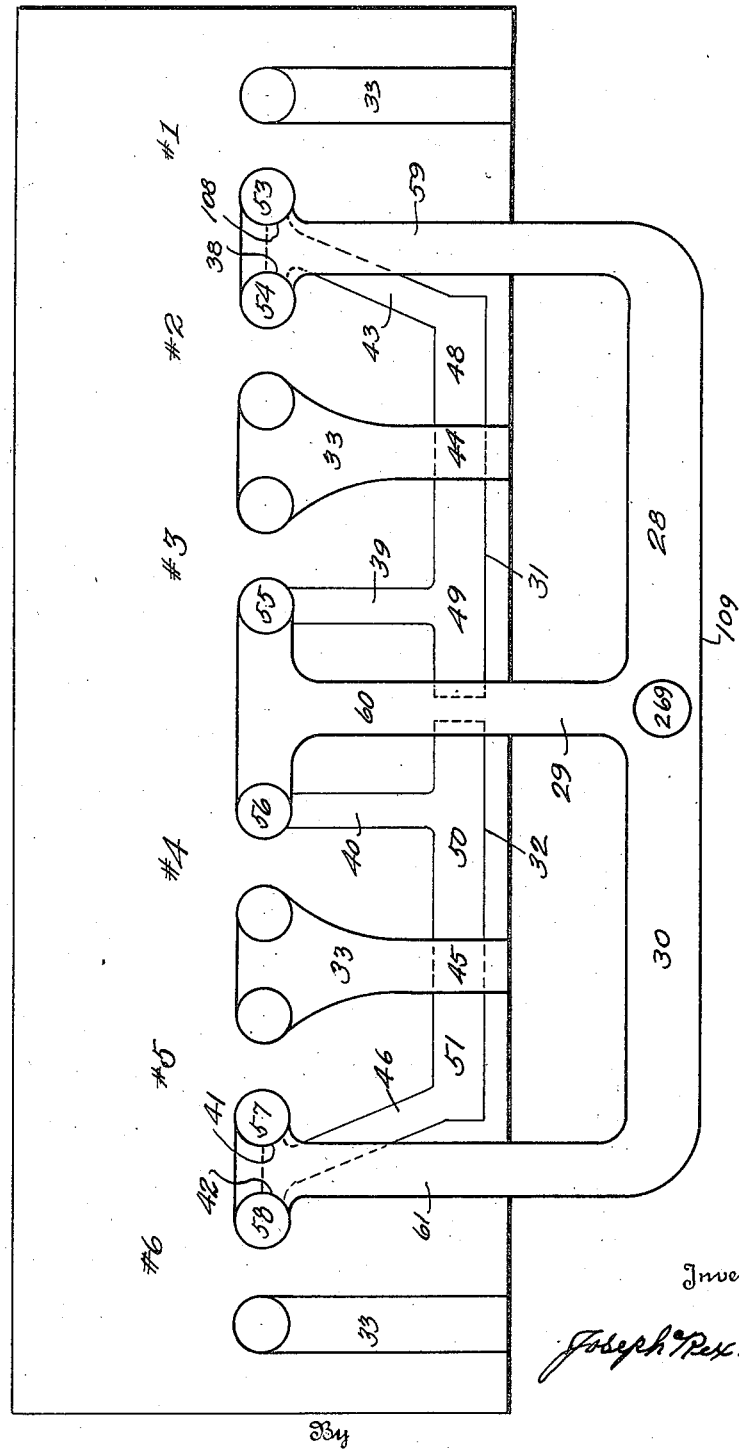

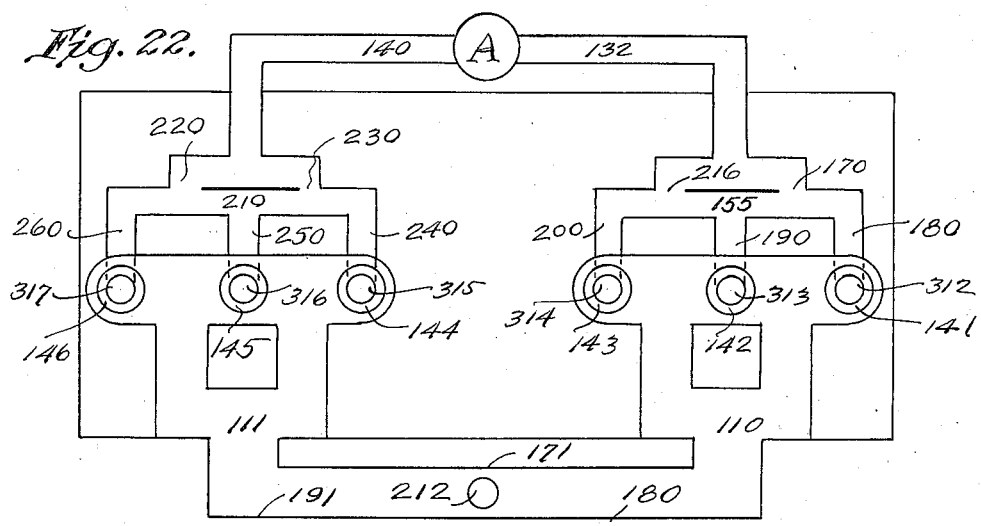
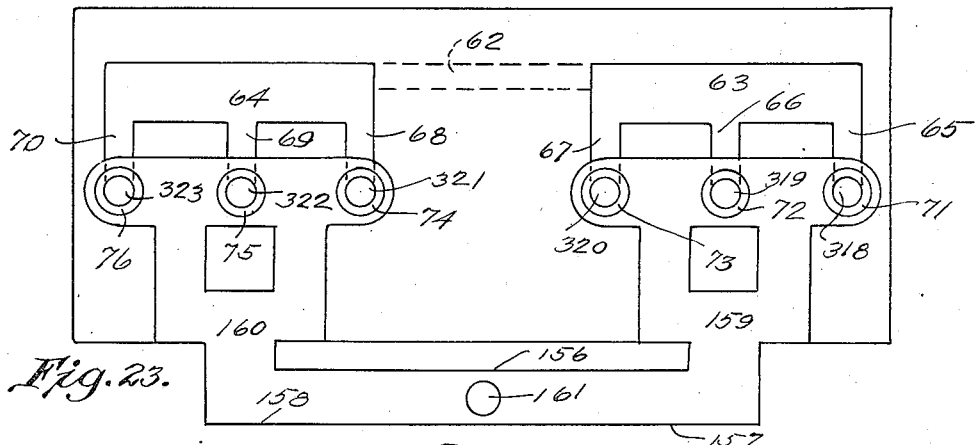
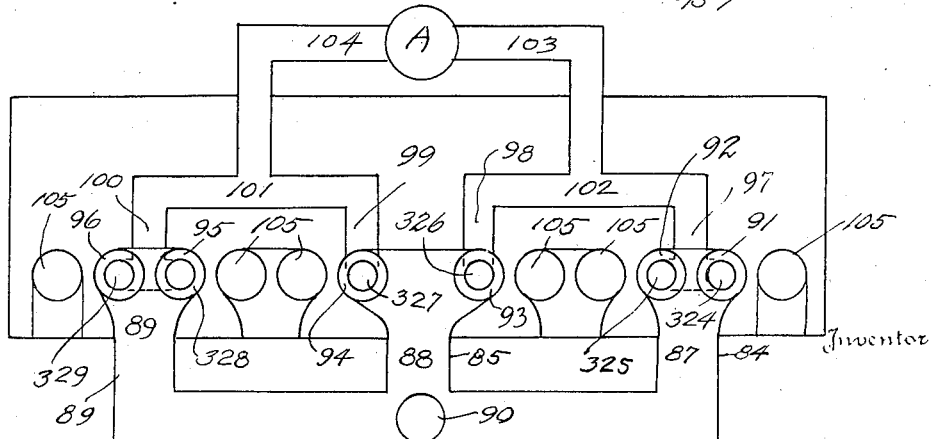

Jan. 18, 1938.  J. R. DAVIS  2,105,780
INTERNAL COMBUSTION ENGINE
Filed Oct. 6, 1933  10 Sheets-Sheet 8

Inventor
Joseph Rex Davis
By Eccleston & Eccleston,
Attorneys

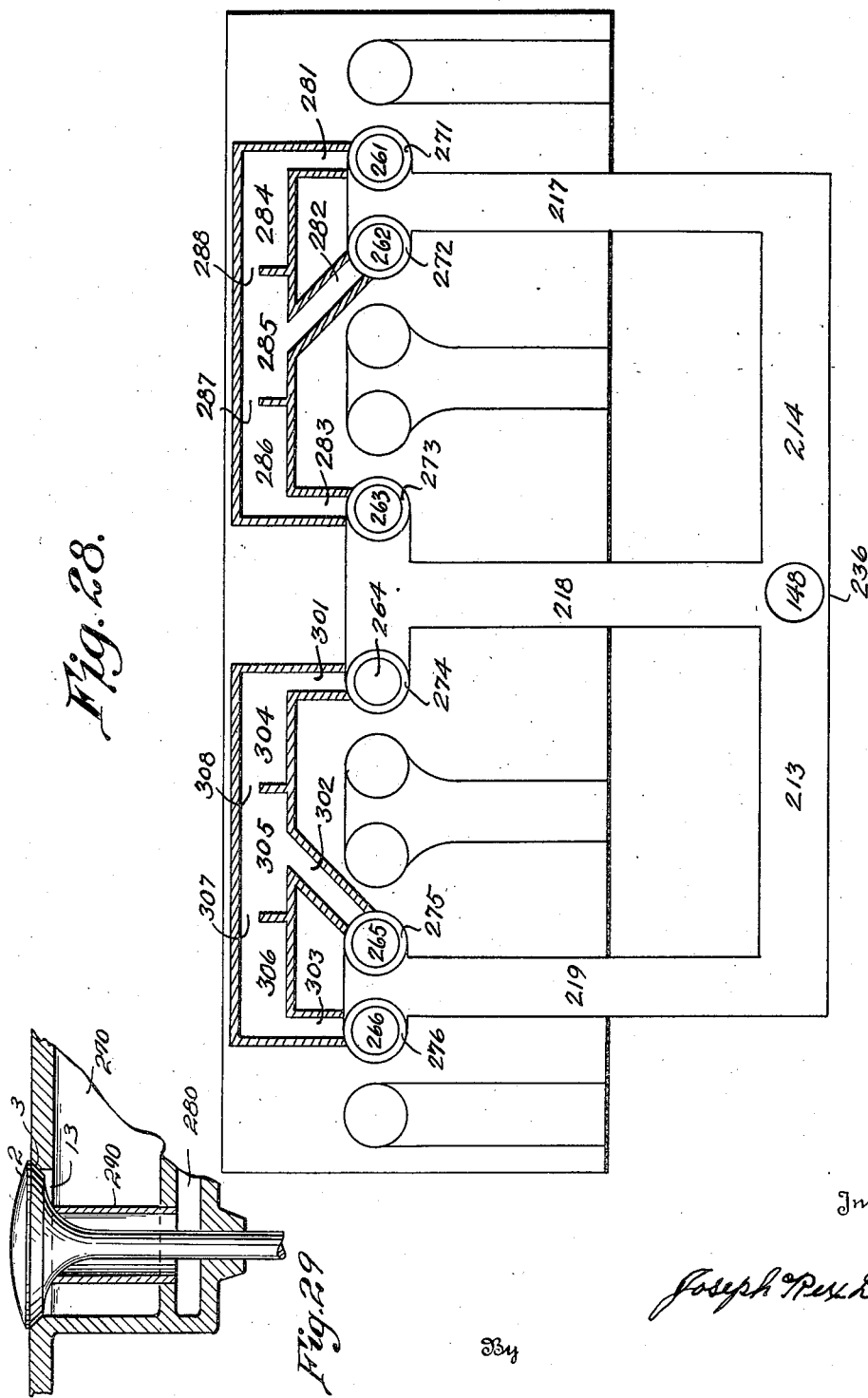

Jan. 18, 1938. J. R. DAVIS 2,105,780
INTERNAL COMBUSTION ENGINE
Filed Oct. 6, 1933 10 Sheets-Sheet 10
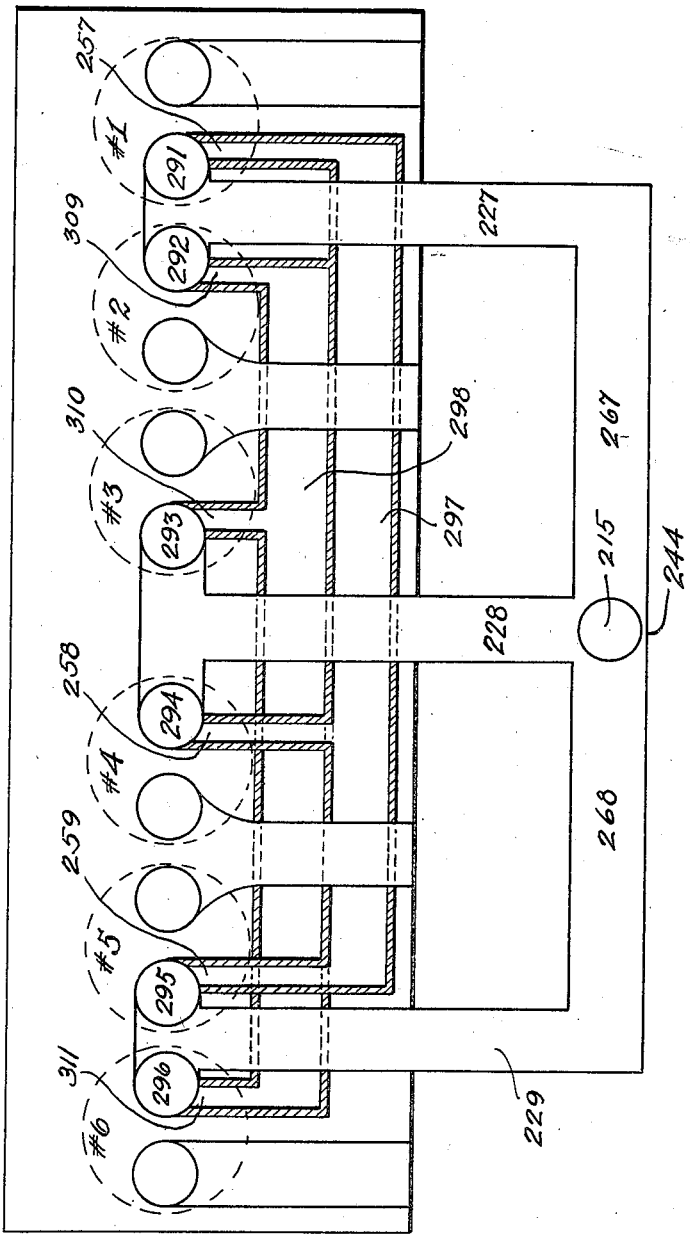
Inventor
Joseph Rex Davis
By
Attorney Patented Jan. 18, 1938

2,105,780

UNITED STATES PATENT OFFICE 2,105,780

INTERNAL COMBUSTION ENGINE

Joseph Rex Davis, Clarksburg, W. Va.

Application October 6, 1933, Serial No. 692,514

17 Claims. (Cl. 123—52)

The present invention relates to internal combustion engines, and has for its primary objects;

To improve the power and efficiency of such engines, by breaking up the fuel into very small particles (without converting it into a gas, when the compression pressures will be relatively high), at the entrance to the cylinder, so that it will be thoroughly mixed with the gases as they pass thru the entrance, and the area of expansion inside of the cylinder, and so that the least possible resistance will be offered to the transference of heat from any portion of the gases to the fuel, during their compression, in order that the temperature occurring in any part of the charge will be restrained from rising to objectionably high values during the compression period. And to convert the fuel which may separate and be carried along in contact with the walls of the intake passage, into a gas (when the compression pressures will be relatively low), by causing it to contact surfaces, having a sufficiently high temperature for that purpose, located at the entrance of the cylinder, so that during its passage thru the entrance and the area of expansion inside of the cylinder, it will be thoroughly mixed with the other constituent parts forming the cylinder contents.

Another object is to provide a trap or equalizing reservoir, located close to the entrance of the cylinder, thru which all of the fuel that may condense or otherwise become attached to, and be carried along toward the cylinder in contact with the walls of the intake passage, must pass.

Another object is to deliver a greater quantity of fuel to the cylinder relative to the quantity of air entering the same, when the throttle opening is increased at any engine speed.

A further object is to control the pressures affecting the quantity of gas passing thru the valve opening into the cylinder, by a regulation of the opening thru which the gas may pass, as the inlet valve closes.

Another object of the invention is to obtain a better scavenging of the combustion chamber, which includes the utilization of the residual gases, so removed, for controlling automatically, the condition of the fuel in the fresh charge, and for the suppression of detonation.

Another object is the utilization, in a multiple cylinder engine, of the pressures occurring at the entrance of one or more cylinders, to provide a more desirable condition of flow, or pressure, at the entrance to some certain other cylinder.

A further object is to keep the gases, passing from the carburetor to the entrance of the cylinder, moving in the same direction during the time the intake valve is closed, that they do move during the time gases are entering the cylinder.

Another object is to cause a desirable quantity of the gases to pass from the cylinder thru the intake port, during certain parts of the time the intake valve is open.

A further object is to prevent the conversion of a material proportion of the fuel into a gas within the cylinder, during the time the first part of the charge is entering same.

In the drawings:

Fig. 1 is a sectional view thru an intake port and the passages adjacent thereto, showing one form of construction in which all of the features of this invention are included.

Figs. 2, 3 and 4 are similar views showing modifications of the construction, shown in Fig. 1, for accentuating some particular phase of the invention.

Fig. 5 is a view taken on section line 5—5, of Fig. 2.

Fig. 6 is a sectional view of the intake passage and port when a more nearly conventional construction is used, than that shown in Fig. 1.

Figs. 7, 8, 9 and 10 are somewhat similar to Fig. 6, showing constructions more readily adaptable to engines having conventional intake passages.

Figs. 11 and 12 are also constructions which may be utilized in engines having conventionally designed intake passages.

Fig. 13 shows a modified construction of the intake passage for obtaining certain features of the invention, which is more readily adaptable to engines during construction.

Fig. 14 is a section thru a portion of an intake valve and its seat, showing the contour of the valve surface.

Fig. 15 is a sectional view thru the intake port and passages adjacent thereto, showing one form of construction, as used on the valve in the head engine.

Fig. 16 is a plan view of one arrangement of the passages, as used in a six-cylinder engine having a firing order of 1—5—3—6—2—4, utilizing one form of the invention.

Figs. 17 and 18 show in more detail, the tube and/or sleeve, as used in Figs. 7 and/or 8.

Fig. 19 is a view of a tube or sleeve of modified construction, more particularly adaptable to installation in engines now in use.

Fig. 20 is a sectional view taken on line a—a, of Fig. 19.

Fig. 21 is a wire spring which may be used for retaining tubes or sleeves similar to Fig. 19, in position in the intake passage.

Figs. 22, 23, 24, 25, 26, 27 and 28 are plan views showing schematically the course of various passages associated with the intake valves.

Fig. 29 is a cross-sectional view showing an arrangement for intermittently preventing communication between the passages.

Fig. 30 is a plan view showing schematically the course of various passages associated with the intake valve.

Figure 25:
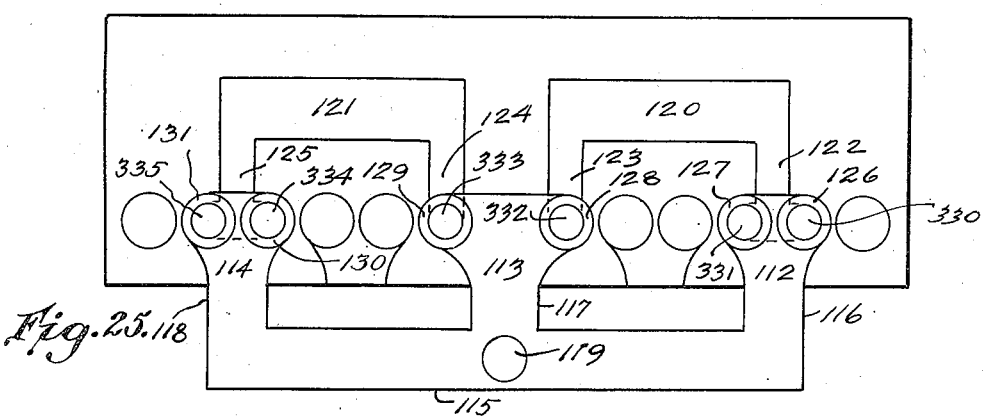

Referring to the drawings in more detail:

The numeral 1, in the several figures, indicates the wall of the intake passage leading to a cylinder of an internal combustion engine, and the numeral 2 indicates an intake valve, which may be of conventional design, cooperating with the valve seat 3.

In Fig. 1, numeral 4 indicates a tube or sleeve, enlarged at one end, as shown by numeral 5. The purpose of this enlargement when used, will appear later in the description of the action of the gases. The other end of this tube projecting some distance into the intake passage represented generally by numeral 10, as indicated by numeral 9, forming a recess, as indicated by numeral 11, partially surrounding tube 4, and acting as an obstruction, the purpose of which will appear later in the description. Numeral 6 indicates a chamber having communication with the space surrounding tube 4, by means of passageway 8. Numeral 7 indicates a passageway for communication between chambers of certain cylinders, in engines having a multiplicity of cylinders. The purpose of passage 7 will be explained more clearly in the description of the invention as applied to a multiple cylinder engine. Numeral 12 indicates a groove or recess provided in the wall of the casting surrounding tube 4, and acting as a continuation of passage 8, serving to equalize the volume of gases passing thru space 13, around the periphery of tube 4. Numeral 14 indicates the contacting surfaces of valve 2 and its seat 3, of which Fig. 14 is a detail view, showing more clearly the contour of these surfaces, after the valve has been seated and in use. The idention of the contact surface of the valve is due to the grinding of the valve on its seat for obtaining a gas tight seal, or from the hammering action of the valve while in operation, and the condition is accentuated by a deposit of carbon which accumulates on the surfaces of the valve, not contacting the seat 3. The contour of these surfaces have a directional effect upon the flow of the gases passing thru the valve opening. This directional effect being the greater, the smaller the space between the valve and its seat. The effects and the use made of this directional effect of the gases will appear in the description of operation. Numeral 37 indicates a space between the tube or sleeve 4 and valve 2, while resting on its seat 3.

In Figs. 2 and 4, numeral 47 indicates a tube or sleeve similar to 4, in Fig. 1, with the exception that it does not project into the intake passage 10, and no enlarged portion is shown on the end next to the valve. However, the use of the enlarged end may be desirable in some instances. In Fig. 2, the recess or groove 12 is shown and intended for the same purpose, as explained in the description of Fig. 1. In Fig. 4, the recess or groove is omitted for the purpose of obtaining the advantages to be desired in some instances by having a more pronounced action of the gases occur at some section of the periphery of tube 4, by the location of the end of passage 8.

The object of the omission from Figs. 2 and 4 of projection 9, of tube 4, as shown in Fig. 1, is to obtain a somewhat greater production of power during extreme high speeds of the engine.

In Fig. 3, the tube or sleeve 52 is of slightly different construction, having a series of holes 15, thru the wall of same. It will be noted that the intake valve 2 operates to prevent the passage of gases thru tube 52, excepting for the amount which is permitted to pass thru holes 15, while it is resting on seat 3. While the holes 15 are shown as being regularly spaced and located near the end of the tube, close to the valve, it will be understood that their object is to control the quantity of gas permitted to pass between intake passage 10, and passage 8, while the valve is sealing the end of tube 52, and their locations are to be such as to provide a desirable mixing of the fuel with the gases. Therefore, their exact location in tube 52, will be effected by several constructional features of the engine, among which are: The location of the intake valve in the combustion chamber, the length and shape of the intake passage, the number of cylinders, the timing of both the intake and exhaust valve operations, and the number of branches in the intake manifold. In the constructions shown, and previously described relative to Figs. 1, 2 and 4, the space between the end of the tube and valve 2, when it is seated, operates somewhat similar to the construction shown in Fig. 3, and has the advantage of not requiring that the valve 2 seat on the edge of the tube. However, the construction shown in Fig. 3 has an advantage in a closer regulation of the transference of gases between intake passage 10, and passage 8, with the added advantage of directing a greater percentage of the residual gases withdrawn from the cylinder thru the intake port, into the space around tube 52, and passage 8. These differences and advantages will appear more clearly later in this description.

In Fig. 5, numeral 12 indicates the groove or recess provided in the wall of the casting surrounding the tube, and acts as a continuation of passage 8, serving to equalize the volume of gases passing around the periphery of the tube or sleeve.

In addition to the benefits obtained from the use of the tubes or sleeves, as explained in connection with Fig. 3, there are other benefits of almost equal importance, which will now be explained in connection with Figs. 6, 7, 8, 9 and 10.

In Fig. 6, the construction and position of the tube or sleeve 77 is very similar to that shown in Fig. 1. The object of the construction shown is to control the condition of the fuel as it enters the cylinder, by providing a recess or reservoir 11, due to the extension of tube 77 into the intake passage 10, as was explained in the description of Fig. 1, into which any liquid fuel traveling towards the cylinder, in contact with the wall 1, of passage 10, will enter, and from which it will be withdrawn at a more uniform rate, and broken up into fine particles, and caused to re-enter the gas stream in this form, due to the turbulent action produced in the gases at this point, by the projections of tube or sleeve 77. Tube 77 further fulfills the office of acting as a medium for transferring a portion of the heat contained in the gases escaping from the cylinder thru the intake port, directly to the fuel, during the first part of the operation of intake valve 2, while being lifted from its seat 3. These hot gases are directed into the space surrounding tube 77, for the reason given in the foregoing description regarding Fig. 1, thereby subjecting the outside of tube 77 to their temperatures, without causing a recession of the liquid fuel along the wall 1 of passage 10, but serving to transfer the heat to the liquid fuel that may pass thru tube 77 in contact with its inner wall. In addition to the transference of heat from tube 77 to the fuel direct, and the breaking up of the fuel obtained from the turbulence produced in the gases, before mentioned, a further quantity of heat is deliverable directly to the fuel, by its being thrown in contact with the surface of intake valve 2. When the quantity of fuel passing thru tube 77 reaches such a proportion that heat transferable to it, from its contact with the surfaces of tube 77 and valve 2, is not sufficient for its gasification, the quantity of gas entering the cylinder and therefore, its pressure at the completion of the compression stroke, will have reached a value, such that it is no longer desirable to have the fuel enter the cylinder as a gas, but preferable to have it broken up into very small particles, retaining its liquid characteristics, but mixed thoroughly with the gases thru the entire charge contained in the cylinder. This breaking up or re-atomizing, and the mixing desired is obtained from the fact that the fuel must lose contact with all surfaces as it passes from tube 77, and is subjected to a high turbulent action of the gases, between valve 2 and its seat 3.

In Fig. 7, the tube or sleeve, as indicated by numeral 78, is somewhat different in construction from that shown in any of the foregoing figures, and the object of this change in construction is to increase the resistance to the transference of heat between the main body of the tube and the wall of the intake passage, thereby permitting not only a quicker change in the temperature of the tube, but providing for its operating thru a wider range of temperatures. This feature is obtained either by providing the tube with an integral ring of small sectional area, as indicated by numeral 150, or by mounting the tube in a ring of the same or some different substance, as shown in Fig 17, the different substance having a lesser heat conducting ability.

In Fig. 8, the tube or sleeve 79 is located sufficiently close to valve 2 so that gases escaping from the cylinder during the first part of the opening movement of valve 2, will be deflected back towards the valve by coming in contact with the upper surface of the ring indicated by numeral 150 This construction being more particularly adaptable for use where the space is limited.

In Fig. 9, the construction of the tube or sleeve 80 is such that a greater heating effect of the walls of the tube will be obtained from the gases escaping from the cylinder, during the first part of the opening movement of valve 2. Also the reservoir or equalizing chamber 11, as shown in Fig 8, is omitted, thereby permitting the temperature of the tube to change more rapidly.

In Fig. 10, a ring 20 having a relatively sharp edge 211, projecting inwardly towards the stem of valve 2, is utilized instead of the longer tube or sleeve, as used in the foregoing figures, and will be found to have a very similar action upon the direction of flow of the gases.

In Fig. 11, a relatively sharp edge 21 is provided by means of machining a recess 22 in the wall 1 of the intake passage 10, which is in effect very similar in action to the construction shown in Fig. 10.

In Fig. 12, a space 23 is provided by means of the groove or recess 24, into which any liquid following the wall 1 of the passage 10, may collect during the inoperative period of valve 2, to be later broken up and mixed with the gas stream entering the cylinder, due to the turbulent action of the gases caused by groove 24. It will be noted that a relatively sharp edge, indicated by numeral 25, has been provided in order to assist in dislodging any liquid fuel from contact with the wall 1 of passage 10, preceding its entrance into the cylinder.

In Fig. 13, a projection 26, and an offset 27, have been provide for equalizing the flow of the liquid fuel and obtaining the desired atomizing effect.

In Fig. 14, numerals 2 and 3 indicate the intake valve and its seat. Numeral 36 indicates the end of the tube or sleeve. Numerals 34 and 35 indicate the projection or enlargements on the valve face, caused by either the seating of the valve, or a deposit of carbon having taken place at these points. Numeral 37 indicates a space between the tube and valve 2.

In Fig. 15, which is very similar to Fig. 1, a modification has been made in the location and arrangement of chamber 6 and passage 7, so as to be better suited for use on valve in the head motors. The object of the re-arrangement being, to retain any liquid entering chamber 6, until such time as it may be converted into a gas or retained in suspension, due to the high velocities occurring therein.

In Fig. 16, numeral 109 indicates in a general way, an intake manifold having three branches, indicated by numerals 28, 29 and 30, for conveying the fuel and air mixture to cylinders numbers 1 and 2, 3 and 4 and 5 and 6, respectively, The numerals 48, 49, 50 and 51 indicate the chambers for cooperating with each of the cylinders, as utilized in one form of construction applied to a six cylinder engine. The numerals 44 and 45 indicate a location of the passages for communication between certain chambers, and thereby effecting communication between certain of the spaces surrounding the tubes. Numeral 31 indicates a series of two chambers associated with cylinders numbers 1, 2 and 3. Numeral 32 indicates a series of two chambers associated with cylinders numbers 4, 5 and 6. Numerals 33 indicate generally, the passages for conveying the exhaust gases away from their respective cylinders, and a portion of the heat contained in these gases may be utilized for increasing the temperature of the contents of the various chambers 48, 49, 50 and 51. Numerals 108 and 38 indicate the passages directly associated with the spaces surrounding the tubes located at the entrance to cylinders number 1 and number 2, respectively. Numeral 43 indicates a passage for communication between chamber 48 and passages 108 and 38. Numeral 39 indicates a passage for communication between chamber 49 and the space surrounding the tube located at the entrance to cylinder number 3. Numeral 40 indicates a passage for communication between chamber 50 and the space surrounding the tube located at the entrance to cylinder number 4. Numerals 41 and 42 indicate passages associated directly with the spaces surrounding the tubes located at the entrance to cylinders number 5 and number 6, respectively. Numeral 46 indicates a passage for communication between chamber 51 and passages 41 and 42. Numerals 53, 54, 55, 56, 57 and 58 indicate intake valves associated with cylinders numbers 1, 2, 3, 4, 5 and 6, respectively. Numeral 59 indicates an intake passage for conveying fuel and air mixture to cylinders numbers 1 and 2. Numeral 60 indicates an intake passage for conveying fuel and air mixture to cylinders numbers 3 and 4. Numeral 61 indicates an intake passage for conveying fuel and air mixture to cylinders numbers 5 and 6.

In Fig. 17 is shown a modification of the tube or sleeve shown in Fig. 7, in which numeral 16 indicates a ring of small cross-sectional area, into which tube 81 is mounted. Ring 16 is intended to serve the same purpose as explained in connection with the ring used in the description applying to Fig. 7.

In Fig. 18, the construction shown, is very similar to that of Fig. 8, the exception being that tube 82 is mounted in a ring 16, in order to obtain the benefits set forth in the description of Figs. 7 and 17, regarding the increased range of temperatures occurring in the tube.

In Fig. 19 is shown a tube or sleeve for use in a manner similar to that shown in Fig. 8, and in which numeral 17 indicates a series of holes for the passage of a quantity of fuel from reservoir 11 into the gas stream at any desirable point around the intake valve. Numeral 19 indicates a spring for retaining the tube or sleeve in its correct position in the intake passage, relative to the intake valve.

In Fig. 20, numeral 17 indicates the location and direction of one of the series of holes shown in Fig. 19. Numeral 18 indicates a groove for cooperation with spring 19.

In Fig. 21 is shown a spring having five sides, for use in the construction shown in Fig. 19. The number and length of the sides of this spring will be determined by the depth of the groove 18, shown in Fig. 20.

In Fig. 22, numerals 141, 142, 143, 144, 145 and 146 indicate the intake valves associated with their respective cylinders. Numeral 171 indicates generally a two branch admission manifold having an opening or passage indicated by numeral 212, for the entrance of the fuel and air mixture thereinto. Numerals 180 and 191 indicate the respective branches for conveying the fuel and air mixture to cylinders numbers 1, 2 and 3, thru intake passage 110, and cylinders numbers 4, 5 and 6, thru intake passage 111. Numerals 132 and 140 indicate passages for conveying the auxiliary air when permitted to pass thru the air valve A, to the respective header passages and/or chambers, indicated by numerals 155 and 210. The air valve indicated generally by A, is a valve for controlling and timing the admission of auxiliary air, and is constructed in accordance with the drawings and descriptions in my application Ser. No. 376,213. Numerals 216 and 170 indicate passages for directing the flow of auxiliary air into the header passage and/or chamber 155, in such a way as to approximately equalize the distances to the individual cylinders Nos. 1, 2 and 3. Passages 220 and 230 are intended for a like purpose, with respect to cylinders Nos. 4, 5 and 6. Numerals 188, 190 and 200, 240, 250 and 260 indicate passages which are the equivalent of passage 280 in Fig. 29, and permit communication between the header passages and/or chambers and intake passages 110 and 111 during the time each intake valve is out of contact with its seat. Each of the passages 188, 190, 200, 240, 250 and 260 is associated with a tube or sleeve similar to that indicated by numeral 290 in Fig. 29 and intake passages 110 and 111 are similar to the passage indicated by numeral 270, also in Fig. 29. This figure is a plan view showing schematically the arrangement of passages for six-cylinder engines having a two branch intake manifold and a firing order of either 1—5—3—6—2—4 or 1—4—2—6—3—5, when auxiliary air is being used.

In Fig. 23, numerals 71, 72, 73, 74, 75 and 76 indicate the intake valves associated with the cylinders 1, 2, 3, 4, 5 and 6, respectively. Numeral 156 indicates a two branch admission manifold having an opening or passage indicated by numeral 161, for the entrance of fuel and air mixture thereinto. Numerals 157 and 158 indicate the respective branches for conveying the fuel and air mixture to cylinders numbers 1, 2 and 3, thru intake passage 159, and cylinders numbers 4, 5 and 6, thru intake passage 160. Numeral 63 indicates a chamber associated with cylinders numbers 1, 2 and 3, and intake passage 159 by means of passages indicated by numerals 65, 66 and 67. These passages 65, 66 and 67 are equivalent to passage 280 in Fig. 29, and are permitted to communicate with their respective cylinders and/or intake passage 159, which is equivalent to passage 270, thru tube 290, as indicated in Fig. 29. Numeral 64 indicates a chamber associated with cylinders numbers 4, 5 and 6, and intake passage 160 by means of passages indicated by numerals 68, 69 and 70. These passages 68, 69 and 70 are equivalent to passage 280 in Fig. 29, and are permitted to communicate with their respective cylinders and/or intake passage 160, which is also equivalent to passage 270, thru tube 290, as indicated in Fig. 29. Numeral 62 indicates a passage which may be used as an equalizing passage between chambers 63 and 64. This figure is a plan view showing schematically the arrangement of passages for six-cylinder engines having a two branch intake manifold and an equalizing passage between the two chambers.

In Fig. 24, the air valve indicated generally by A, is a valve for controlling and timing the admission of auxiliary air, and is constructed in accordance with the drawings and descriptions in my application, Ser. No. 376,213. Numeral 83 indicates a three branch admission manifold of which branch 84 conveys the fuel and air mixture to cylinders numbers 1 and 2, thru intake passage 87 and the openings of intake valves 91 and 92, respectively. Branch 85 conveys the fuel and air mixture to cylinders numbers 3 and 4, thru intake passage 88 and the openings of intake valves 93 and 94, respectively. Branch 86 conveys the fuel and air mixture to cylinders numbers 5 and 6, thru intake passage 89, and the openings of intake valves 95 and 96, respectively. Numeral 90 indicates an opening or passage thru which admission manifold 83 receives its supply of fuel and air mixture. Numeral 97 indicates a passage for conveying auxiliary air to cylinders numbers 1 and 2. Numeral 98 indicates a passage for conveying auxiliary air to cylinder number 3. Numeral 99 indicates a passage for conveying auxiliary air to cylinder number 4. Numeral 100 indicates a passage for conveying auxiliary air to cylinders numbers 5 and 6. Numeral 102 indicates the header passage and/or chamber associated with cylinders numbers 1, 3 and 2. Numeral 101 indicates the header passage and/or chamber associated with cylinders numbers 4, 5 and 6. Numerals 103 and 104 indicate the passages for conveying the auxiliary air as it is permitted to pass thru air valve A, to each of the respective header passages and/or chambers 102 and 101. Numerals 105 indicate the exhaust valves for the respective cylinders. This figure is a plan view showing schematically the arrangement of passages for six-cylinder engines having a firing order of either 1—5—3—6—2—4 or 1—4—2—6—3—5, when auxiliary air is being used.

In Fig. 25, numeral 115 indicates a three branch admission manifold of which branch 116 conveys the fuel and air mixture to cylinders numbers 1 and 2, thru intake passage 112 and the openings of intake valves 126 and 127, respectively. Branch 117 conveys the fuel and air mixture to cylinders numbers 3 and 4, thru intake passage 113 and the openings of intake valves 128 and 129, respectively. Branch 118 conveys the fuel and air mixture to cylinders numbers 5 and 6 thru intake passage 114, and the openings of intake valves 130 and 131, respectively. Numeral 119 indicates an opening or passage thru which admission manifold 115 receives its supply of fuel and air mixture. Numeral 120 indicates a chamber associated with cylinders numbers 1, 2 and 3, and intake passages 112 and 113, by means of passages 122 and 123. These passages 122 and 123 are permitted to communicate with their respective cylinders and/or intake passages 112 and 113. Numeral 121 indicates a chamber associated with cylinders numbers 4, 5 and 6 and intake passages 113 and 114 by means of passages indicated by numerals 124 and 125. These passages 124 and 125 are permitted to communicate with their respective cylinders and/or intake passages 113 and 114. This figure is a plan view showing schematically the arrangement of passages for six-cylinder engines having a three branch intake manifold.

Figure 26:
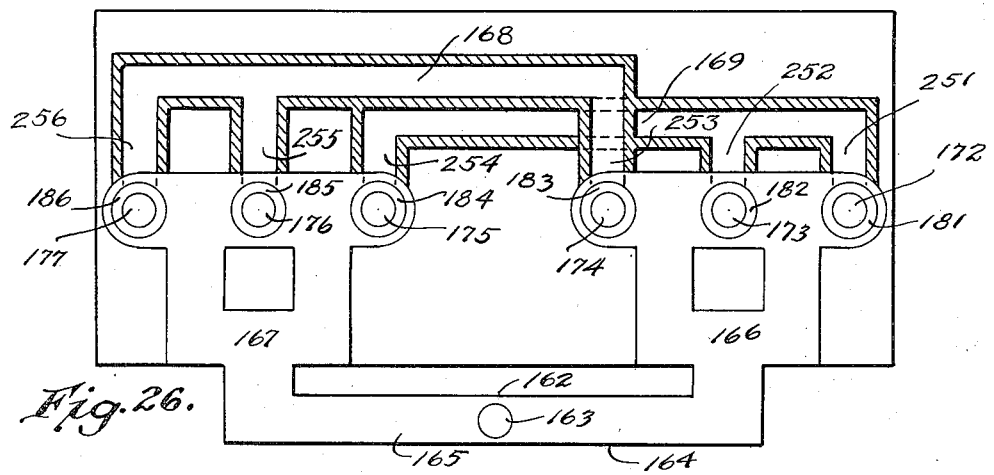

In Fig. 26 is shown a schematic arrangement of the passages for a six-cylinder engine having a two branch manifold for conveying the fuel and air mixture from the carburetor to the various cylinders. The passages for obtaining a cooperative action between the entrances to the various cylinders, are so arranged that cylinders numbers 1, 2 and 4, and cylinders numbers 3, 5 and 6, are associated with each other, in such a manner that the intake valves will operate relative to the chambers in a manner somewhat similar to the action obtained from the arrangement of passages shown in Fig. 16, when a firing order of 1—2—4—6—5—3 or 1—3—5—6—4—2 is used, with any one of the four standard firing orders for six-cylinder engines.

Figure 27:
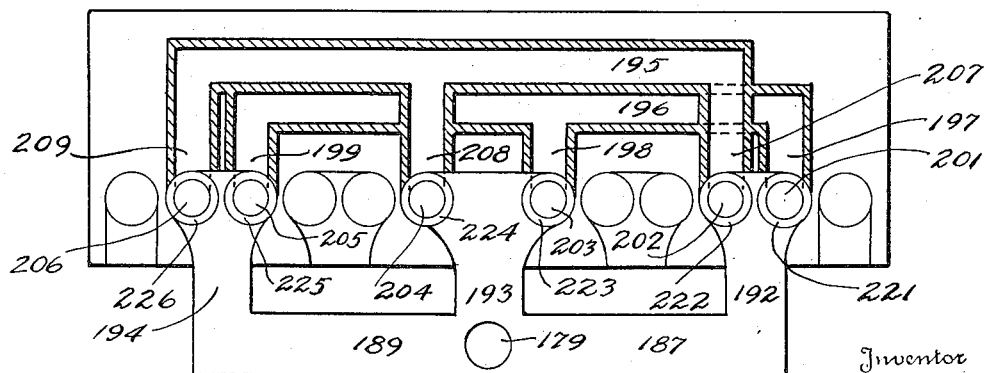

In Fig. 27 is shown a schematic arrangement of the passages for a six-cylinder engine having a three branch manifold for conveying the fuel and air mixture from the carburetor to the various cylinders. The passages for obtaining a cooperative action between the entrances to the various cylinders, are so arranged that cylinders numbers 1, 3 and 5, and cylinders numbers 2, 4 and 6, are associated with each other, in such a manner that the intake valves will operate relative to the chambers in a manner somewhat similar to the action obtained from the arrangement of passages shown in Fig. 30, when a firing order of 1—5—3—6—2—4 or 1—4—2—6—3—5 is used, with any one of the four standard firing orders for six-cylinder engines.

In Fig. 28 is shown schematically an arrangement of passages, applicable to a six-cylinder engine, utilizing a three branch admission manifold, in which each of the header passages and/or chambers are divided into three approximately equal sections, with each section arranged to be directly associated with a single intake valve, in order that a more complete control of the flow of gases may be had by means of restricting the flow of gases between the different sections. This arrangement of passages, in which the entrances to cylinders numbers 1, 2 and 3 are associated with one series of header passages and/or chambers, and cylinders numbers 4, 5 and 6 are associated with another series of header passages and/or chambers, will provide for the operation of the intake valves relative to the two series of header passages and/or chambers, in a manner somewhat similar to the action obtained from the arrangement of passages shown in Fig. 16, when a firing order of 1—5—3—6—2—4 or 1—4—2—6—3—5 is used. Also, the arrangement of passages shown in Fig. 28 and Fig. 16, will operate in a manner somewhat similar to each other, when a firing order of 1—2—4—6—5—3 or 1—3—5—6—4—2 is used, but in a manner entirely different from the action occurring when the former firing orders of either 1—5—3—6—2—4 or 1—4—2—6—3—5 was used.

In Fig. 29, numeral 270 indicates the passage for conveying fuel and air mixture. Numeral 280 indicates the passage for communication with the header passage and/or chamber. Numeral 290 indicates the tube or sleeve, for directing the flow of gases, while intake valve 2 is out of contact with its seat 3, and also for preventing communication between passages 270 and 280, during the time valve 2 is in contact with its seat 3.

In Fig. 30 is shown a schematic arrangement of the passages for a six-cylinder engine having a three branch manifold for conveying the fuel and air mixture from the carburetor to the various cylinders. The passages for obtaining a cooperative action between the entrances to the various cylinders, are so arranged that cylinders numbers 1, 4 and 5, and cylinders numbers 2, 3 and 6, are associated with each other, in such a manner that the intake valves will operate relative to the chambers in a manner somewhat similar to the action obtained from the arrangement of passages shown in Fig. 16 when a firing order of 1—5—3—6—2—4 or 1—4—2—6—3—5 is used, when utilizing a firing order of 1—2—4—6—5—3 or 1—3—5—6—4—2, and also in a manner somewhat similar to Fig. 16 when a firing order of 1—2—4—6—5—3 or 1—3—5—6—4—2 is used, when utilizing a firing order of either 1—5—3—6—2—4 or 1—4—2—6—3—5.

It is understood by those versed in the art, that the present day fuels, known as gasoline, are composed of a mixture of hydrocarbons, having widely different characteristics, such as their proportion of hydrogen and carbon, latent heat and boiling point: It being not uncommon to encounter fuels in which the boiling point of the constituent parts varies from 100° to 400° F., and it is also understood that certain of the constituent parts of the present day fuels have a greater tendency to produce the condition known as detonation, than others, and that this objectionable condition is aggravated by either or both increasing the compression pressure or increasing the temperature of the gases, preceding their entrance into the cylinder, or insufficient fuel in proportion to the quantity of air. It is also well understood that some quantity of the fuel must be converted into a gaseous state, before any combustion can take place, but that any increase in the temperature of the gases, for this purpose, preceding or during their induction into the cylinder, detracts from the volumetric efficiency of the engine, thereby reducing the maximum power obtainable therefrom. It is further understood that the fuel and gases utilized in such engines, have different weights, which are at variance with each other, and that therefore, according to their weight their movement will be affected. The effects of the inertia and momentum being manifest by both, and being the greater in the heavier. It is also obvious that a given quantity of fuel in the liquid state, even though divided into very small particles, will occupy a very considerable less space at a given pressure, than the same quantity of fuel will occupy after its conversion from the liquid to the gaseous state, at the same pressure. Therefore, the greater the proportion of fuel remaining in the liquid state, during the induction period, the greater will be the volume of air and fuel entering the cylinder during this time. It is further obvious that fuel converted from the liquid to the gaseous state, in an atmosphere composed almost wholly of the products of a previous combustion, will not be burned as completely or as readily, as fuel gasified in an atmosphere containing free oxygen.

During the operation of an engine in which the fuel is mixed with a quantity of air, preceding its entrance into the cylinder, the fuel and air mixture must be maintained in such a condition, that a sufficient quantity of fuel is mixed with the air as to provide the cylinder with a combustible charge, ignitable by whatever means is employed for that purpose. In engines of conventional design, the fuel and air mixture must be maintained in such a condition, that a relatively uniform mixture of the fuel and air will be delivered to the cylinder. Under ordinary conditions, this requires that a sufficient temperature and velocity be maintained in the passage for conveying this mixture, that an undue separation of the fuel from the air will not occur. However, in engines of conventional design, it frequently happens, due to insufficient heat or lack of sufficiently high velocities, particularly at low engine speed, that a quantity of fuel condenses from the fuel and air mixture, or is otherwise deposited on the surface of the intake passage, thereby causing either insufficient fuel to enter the cylinder, or to enter at an incorrect time. Also a sudden increase in the velocity of the gases, may cause too much fuel to reach the cylinder. Any of the three foregoing conditions will result in a reduction of the power or efficiency of the engine.

The constructions about to be described, serve to relieve or remove the above objectionable features of the conventional construction, besides producing many other beneficial results by the control which they afford.

The construction of the tube or sleeve shown in place in Fig. 8, and modifications of which are shown in Figs. 18, 19 and 20, when intended for engines having an intake valve timing such that the valve begins its opening movement preceding the completion of the exhausting stroke, is such that the clear area for the passage of gases thru the opening inside of the tube, is approximately 70 per cent of the area of the clear diameter of the intake port, and is to be so positioned relative to the valve seat, that a straight line coinciding with the surface of said seat, and extended inwardly, would meet the end of the tube or sleeve 79, at approximately the point at which the inner surface of said tube meets the flat surface closest the valve, of the supporting ring 150. The area of the inside surface of the tube or sleeve, and therefore, its length, will depend upon a number of factors, such as, the compression ratio, the exact valve timing, the heat conductivity of the material of the tube or sleeve, along with due consideration for the method of supporting same within the passage, and the total capacity of the intake passages, all of which are factors principally concerned with the particular design of a given engine. The dominating requirement being, that the tube or sleeve deliver enough heat, received principally from the gases of a preceding explosion, to convert into a gas the principal part of the fuel contacting its surface during the first part of the inflow of gas into the cylinder, which should occasion a sufficiently rapid loss of heat, that the following fuel may be thoroughly atomized by the turbulent action of the gases, without being converted into a gas.

In the modified construction of the tube or sleeve, as shown in Fig. 18, the tube 82 is shown mounted in a ring 16 which may be of a material having a different heat conducting ability, in order to obtain a more rapid change in the temperatures of the tube.

The modification shown in Figs. 19 and 20, is constructed in such a way that the tube or sleeve may be more readily applied and held in its correct position in the intake passage, by reason of the angular parts of the spring 19 being forced into a groove provided for that purpose at the correct location in the inner wall of the passage. This construction serving at the same time to increase the resistance to the flow of heat to and from the wall of the passage. The holes 17 may be located so that a greater percentage of the fuel may be caused to enter the cylinder from a location around the valve, that will cause it to be less likely to contact the inner surface of the combustion chamber.

The dimensions of the various parts, as shown in Fig. 13, are arrived at in a manner very similar to that given in the description of Fig. 8. The principal difference in the construction being, that in Fig. 13, the desired conditions are met by a proper machining of the metal surrounding the intake passage.

The construction shown in Fig. 11, is obtained by providing an intake passage which is a sufficient amount smaller in diameter near the intake valve than the desired intake port, so that a groove 22 may be machined in the metal forming the wall of the intake passage, in such a way that the relatively sharp edge 21, will be provided. This edge 21 being located so that it would touch a straight line projected inwardly from and coinciding with the surface of the valve seat. This construction provides for some increase in the temperature of the thinner projecting edge, due to hot gases escaping from the cylinder thru the intake port, during the first part of the opening of the intake valve, and also for preventing the passage of liquid fuel into the combustion chamber without having first been dislodged from contact with all hot surfaces. It also serves to reduce the distance to which the residual gases would otherwise be injected into the fuel and air mixture contained in the intake passage, by causing these residual gases to be deflected back towards the valve.

In the construction shown in Fig. 10, a ring 20 having a relatively sharp edge 211, is pressed into the intake passage, so that the edge 211 will occupy approximately the same position relative to the valve seat as that of the corresponding edge 21 as described in connection with Fig. 11. The advantages of the construction shown in Fig. 10 over those shown in Fig. 11 are, that the desired deflection of the residual gases is more readily obtained, and a wider selection of materials for the construction of ring 20, is permissible.

In the construction shown in Fig. 12, an annular groove 24 is provided in the wall of the intake passage, so that a space 23 having sufficient capacity to contain all liquid fuel forced to the entrance of the cylinder, during and following the closing of the intake valve, by its (liquid fuel) momentum, will be containable therein. An intake passage of such a size, is provided, that its diameter at the location of edge 25, is a sufficient amount smaller than the diameter of the intake port, that the principal part of the hot residual gases passing from the cylinder between valve 2 and its seat 3, during the first part of the opening movement of valve 2, will impinge against the surface of groove 24 farthest from the intake valve, thereby providing for a reflection of the residual gases towards the valve, and a breaking up of any liquid fuel entering the space 23 while the intake valve was closed.

In the construction shown in Fig. 9, the tube or sleeve 80 is so located and arranged, that an annular space is provided, into which the residual gases escaping from the cylinder between valve 2 and its seat 3, will be projected, thereby providing for the transfer of a greater percentage of the heat contained in these gases, to the inner surface of the tube, and at the same time providing for their more complete segregation from the gases occupying the intake passage at the time of their entrance, in a way which will cause them to be drawn back into the cylinder, mixed with the fresh gases, in a more desirable manner. The size of the annular space surrounding the tube or sleeve 80, is to be adjusted in accordance with the quantity of residual gases passing out of the cylinder thru the intake port, during the first part of the opening movement of intake valve 2, and is therefore materially affected by the intake valve timing, along with the other factors named in the description of the construction and operation applying to Fig. 8.

In the constructions shown in Figs. 6 and 7, practically the same provisions for operation are made as were explained in connection with Fig. 9, with the exception that the additional space 11 has been provided, in order to procure a more uniform delivery of that fuel which may condense against the walls of the intake passage, to the inner surface of the tube or sleeve and the cylinder. In Fig. 6, a ring-like projection of the material composing the passage wall, has been provided, projecting inwardly, into which the tube or sleeve 77 is pressed; the tube or sleeve being of cylindrical form and of such a size and length, that when the end nearest the valve is so located as to give the proper area of the space between the valve and the tube, the desirable spaces for the reception of the residual gases, and for the reception of the liquid fuel which has attached itself to the walls of the intake passage, are provided.

The foregoing description of construction and operation applies equally well to the construction shown in Fig. 7, with the exception that the tube or sleeve 78 is supported in the intake passage, by means of a flange surrounding the tube, as indicated by numeral 150, so that a better regulation of the heat flow, to and from tube 78, may be had. The modification of the tube or sleeve used in this figure, as shown in Fig. 17, provides for a better control of the temperatures of the tube.

In the foregoing descriptions of construction and operation the beneficial results obtained, are provided almost wholly, by the actions and reactions occurring at the entrance to each individual cylinder, and in a manner almost wholly independent of the actions and reactions occurring at the entrance to some other cylinder; and while the construction and description applying to each of the several figures, has been directed more particularly to engines in which a liquid fuel is used, some of the features will be found beneficial in engines utilizing gaseous fuels.

The constructions about to be described, contain many new features not found in the preceding descriptions of construction and operation. However, it will be apparent that the principal features appearing in the preceding descriptions, are all retained, to a greater or less degree.

A description of the construction shown in Fig. 1, along with some of the details of operation, will now be given, in order to explain a part of the additional fundamentals of this invention, when an associated passage or chamber, or both, are utilized. The construction shown in this figure, is somewhat similar to the constructions previously described, and more particularly to the constructions shown in Figs. 6, 7 and 9, with the exception that provisions have been made for permitting an increase in the quantity of gases, which may flow thru the space surrounding the tube or sleeve 4, by means of the additional passageway, indicated by the numeral 8. The tube or sleeve, indicated by numeral 4, is constructed of a substance having the desired heat conducting ability, and is of such a diameter relative to the diameter of the intake port, that the area of the annular space 13 between the outer surface of tube 4 and the wall of the larger passage, will have the desired relationship to the varying areas presented by the opening and closing movements of valve 2, and the area of the inside diameter of the tube or sleeve. The length of the tube or sleeve 4 is such, that when the area of the space indicated by numeral 37, is adjusted so that it provides the desirable relationship between the varying areas presented by the opening and closing movements of valve 2, and the area of the space 13, a projection 9 will be provided, so that the space 11 will have sufficient capacity to cause all liquid fuel entering the same, to be delivered in a uniform manner thru the inside of tube 4. The projecting part of the tube or sleeve, as indicated by numeral 5, may be provided, for the purpose of restricting the flow of gases thru space 13, when such restricting action is desirable for obtaining a better regulation in the flow of the gases, without interfering with the heat flow characteristics of the tube or sleeve. The space indicated by numeral 12, provides for a more uniform condition of both the heat transference and flows of gases, occurring around the periphery of tube 4. The chamber indicated by numeral 6, is shown larger than passageway 8, in order to indicate an ability to control the volume of gases and the relative time they are in motion, in a definite direction, from which it will be understood that the desired quantity of gases may be containable in a passage having no enlargement, and still operate as a chamber. The required capacity, or volume containable within the passage or chamber, will be dependent upon both the specific constructions used in an engine, and several varying factors of operation, among which are:—the piston displacement, the cross-sectional area and length of the intake passage, the timing of both the intake and exhaust valves, and the compression ratio. Also one of the factors entering into the determination of the minimum capacity of the passage or chamber, particularly in engines operating under varying speed and load conditions, is, the volume of gases necessary to be drawn thru the carburetor and intake passage or passages, during the time the intake valve or valves are closed, in order to have the desired flow of gases established and ready to force themselves into the cylinder, as soon as this is permissible, when the throttle opening is increased. The passage indicated by numeral 7, is intended to represent any restrictions in the passage or chamber, for the additional control or conditioning of the gases entering same, or to represent more particularly in multiple cylinder engines, a passage for communication between the chambers associated with the individual cylinders. The additional control of the quantity of gases passing around the tube or sleeve, afforded by the use of passageway 8, materially increases not only the benefits to be obtained from the construction shown in this figure, over those of the figures previously described, but makes possible the use of a large number of variations in construction, for accentuating the various results desired to be obtained, during the operation of the engine.

During the first part of the opening movement of valve 2, gases will be projected into the space indicated by numeral 13, surrounding the tube or sleeve 4, during that portion of the time in which the pressures in the cylinder exceed the pressures in passages 8 and 10, thereby delivering a quantity of their heat to the wall of the tube or sleeve, for the conversion into a gas, of any liquid fuel in contact with the inner surface of same. Immediately following this action, gases will begin to enter the cylinder, due to the displacement of the piston, and the first of the gases will be drawn from the space inside of the tube, due primarily to the necessity for a reversal of the direction of flow of the gases, occurring in space 13, before they could reenter the cylinder. However, as the quantity of gases entering the cylinder, increases, the quantity passing thru tube 4, will increase, and some additional quantity will be supplied to the cylinder, thru space 13, during the time the pressures in the cylinder are less than those pressures existing in passages 8 or 10, after which, as the pressures increase in passage 10, during the time valve 2 is closing, a flow of gases will continue from passage 10, thru the inside of tube 4, and the spaces 37 and 13, into passageway 8, until such time as the pressures in space 13 and tube 4, become equal.

The foregoing described action of the gases, would continue to occur during the operation of the engine at constant speed, with any throttle opening. However, should the throttle opening be increased, the action of the gases will change, in the following manner, which is very beneficial in the way of causing the engine to deliver a greater amount of power, during its acceleration in speed: As the pressures increase in passage 10, due to the increased throttle opening, the difference in the relative pressures on the inside and around the outside of the tube or sleeve 4, will increase, causing an increased velocity of the gases flowing thru spaces 37 and 13, to occur, even though the passage into the cylinder, be closed. This increased flow of gases thru the space 37, will have a direction of flow, which would more easily enter the space between the valve and its seat than it will enter space 13. Therefore, as the valve opens, gases will be forced into the cylinder more quickly than is the case when the aforementioned conditions do not exist. The increased and more continuous flow of the gases at the entrance to the cylinder, also causes the fuel and air mixture to be maintained in a much better condition for its use in the cylinder, and extreme variations in the fuel to air ratio, occurring near the carburetor, during rapid acceleration, are more or less compensated for, by the further mixing of the fuel and gases, due to the by-passing action occurring at the entrance to the cylinder. Also, any liquid fuel collecting on the wall 1 of passage 10, and flowing along in contact therewith, will eventually reach space 11, provided by the projection 9 of tube 4, from which space it will be delivered in a uniform manner, to the inside of tube 4. The temperatures attained by tube 4, will be sufficient to convert into a gas, any liquid fuel which may be contacting the inner surface thereof, during the time, or immediately following the first opening movement of valve 2. By the time the velocity of the gases passing thru the tube or sleeve 4, has reached a value, such that it would cause any liquid fuel to be disengaged from the end of the tube or sleeve, nearest the valve, the velocity of the gases passing thru space 13, will be sufficiently great, to provide for its complete atomization.

From the foregoing description of the actions procurable from the construction shown, it will readily be apparent that a quantity of the hot residual gases occupying the combustion chamber, at the time the intake valve begins to open, can be withdrawn, and a portion of their heat utilized for converting a quantity of the liquid fuel into a gas, in such a manner that the gaseous fuel mixed with air, will be the first gases to enter the cylinder. Also, it will be apparent that a quantity of the residual gases which have been more or less reduced in temperature, will be caused to reenter the cylinder, in such a way that they will be distributed more or less uniformly through the entire charge. It will be further apparent that the first part of the charge entering the cylinder, will be composed wholly of gases that will expand uniformly, at any temperature to which they are exposed during this period of operation of the engine, and that this first quantity of gases entering the cylinder, may be followed by a further quantity of gases containing fuel in a finely divided liquid state, which would be expanded to a very much greater volume, by coming directly in contact with the hot inner surfaces of the combustion chamber, which would occur, were it not preceded by a quantity of dry gases. The provision for the supply of a quantity of dry gas for entrance into the cylinder, during the existence of the relatively small areas of the opening past the intake valve, during its opening movement, followed by gases containing the fuel in a finely divided liquid state, provides a further beneficial result, by either cooling the dry gases which have entered the cylinder, or preventing their increase in temperature to as great a degree, during the time the intake valve occupies its wide open position, thereby providing for an increased cylinder filling.

The foregoing description of operation, as applying to Fig. 1, has been confined almost entirely, to the actions which would occur when this construction is used, in a single-cylinder engine. However, as this same construction at the entrance to the cylinder, is utilized in conjunction with connecting passages between the entrances of various cylinders, in multiple-cylinder engines, the action of the gases can be very materially changed by a selection of the cylinders, the entrances of which are to be associated together, by means of connecting passages. Therefore, some of the results of the application of the construction shown in Fig. 1, as applied to a six-cylinder engine, with various arrangements of connecting passages, will now be given.

In Fig. 16, is shown an arrangement of passages for connecting the spaces 12, indicated in Fig. 1, of cylinders numbers 1, 2 and 3, and cylinders numbers 4, 5 and 6, together. These passages are indicated by numerals 108, 38, 39 and 43, and 40, 41, 42 and 46, respectively. Each group of passages is associated with enlarged spaces indicated by numerals 48 and 49, and 50 and 51, respectively, which operate as chambers for their respective groups.

It will be apparent that the modified constructions shown in Figs. 2, 3 and 4, are also adaptable for use with the various groups of passages shown in the several figures, and that they are subject to an equally wide range of areas being provided between the passages, or between the cylinder and the passages.

From the foregoing descriptions of construction and operation, which have been confined, more particularly to constructions as applied to one and six cylinder engines, it will be found that not only the number of cylinders and their firing order, but the size and shape of the admission manifold, the timing of both the intake and exhaust valves, the compression ratio, the position of the cylinders relative to each other and their varying distances from the fuel supply, and the use or not of a supply of auxiliary air, will materially affect not only the construction at the entrance to the cylinder, but the size, number and arrangement of the passages associated therewith.

Although the descriptions have been confined to one and six cylinder engines, it will be apparent that the same principles may be applied to engines of any number of cylinders, without departing from the spirit of this invention.

What I claim is:

1. An internal combustion engine including a cylinder and intake manifold, a positively operated valve between the manifold and cylinder, a chamber adjacent the valve, and a sleeve mounted in the manifold and associated with said valve so as to provide a passage of varying predetermined cross-sectional areas between the chamber and manifold.

2. An internal combustion engine including a cylinder and intake manifold, a valve between the manifold and cylinder, a chamber adjacent the valve, a sleeve mounted in the manifold adjacent the valve, said sleeve being so arranged as to provide a permanently open passage between the manifold and chamber and having the end farthest from the valve projecting into the manifold to provide an annular ledge.

3. An internal combustion engine including a cylinder and intake manifold, a valve between the manifold and cylinder, a chamber adjacent the valve and in communication with the manifold, and a sleeve mounted in the manifold with its ends spaced therefrom, one portion of the sleeve coacting with the valve and manifold to limit the extent of communication between the chamber and sleeve and another portion of the sleeve serving to cause an atomization of liquid passing toward the valve.

4. An internal combustion engine including an intake manifold and two or more cylinders, a valve between the manifold and each cylinder, a passage terminating adjacent two or more of said valves, and means associated with one of said valves for controlling the flow of fluid thru said passage, said means including an orifice having varying areas.

5. An internal combustion engine including a cylinder and a passage for conveying a charge thereto, a valve at the entrance to said cylinder, a second passage terminating adjacent said valve and opening into the first passage, and means for controlling the area of the opening between said two passages.

6. An internal combustion engine including a cylinder and intake manifold, a valve between the manifold and cylinder, a chamber adjacent the valve and opening into the manifold, and means for varying the area of the opening between the manifold and chamber in accordance with the area of the opening between the said manifold and cylinder.

7. An internal combustion engine including a cylinder and intake manifold, a valve between the manifold and cylinder, a chamber adjacent the valve and opening into the manifold, and means for causing the area of the opening between the manifold and chamber to be reduced as the said valve closes.

8. An internal combustion engine including a cylinder and an intake passage, an intake port and valve for said cylinder, means adjacent the valve for trapping residual gases, a tube of high thermo-conductive ability for rapidly conveying the heat of the residual gases to its entire surface, said tube being of such mass that its temperature will rapidly adjust itself to that of the surrounding gases, means for supporting said tube substantially concentric with the intake valve and in a manner to minimize any heat transference to the support, the position of said tube being such that any liquid retaining contact with the wall surfaces of the intake passage will contact its surface before reaching the entrance of the cylinder for gasification of the fuel entering the cylinder during the first part of each cylinder charge, the mass of the tube being such that the gasification of a small percentage of the fuel required for a maximum cylinder charge will reduce the temperature of the tube sufficiently to permit the following fuel to pass over its surface in a liquid state and be atomized by the then high velocity of the gases entering the cylinder.

9. An internal combustion engine including a cylinder and an intake manifold, a positively operated valve between the manifold and cylinder, a chamber adjacent the valve, and means in the manifold for varying the flow of fluid between the manifold and chamber, said means including an orifice having varying areas controlled by the said valve.

10. An internal combustion engine including a cylinder and a passage for conveying a charge thereto, a valve at the entrance to said cylinder, a second passage terminating adjacent said valve and opening into the first passage, and a sleeve mounted in said second passage, said sleeve being so constructed and arranged as to co-act with the valve for controlling the areas of the opening between said two passages.

11. In an internal combustion engine having a cylinder, a chamber, and a passage for conveying the combustible charge to the cylinder, a positively operated intake valve, said engine provided with a plurality of passageways communicating with the passage adjacent said intake valve, one of said passageways communicating with the said passage and the chamber through an aperture having varying areas.

12. In an internal combustion engine having a carburetor, a cylinder and a chamber, a passage for communication between the cylinder and chamber, a positively operated valve for controlling communication between the said cylinder and chamber, a second passage for maintaining constant communication between the carburetor and said first passage, said second passage terminating with a sleeve substantially concentric with the said valve, said sleeve being so constructed and arranged as to provide an orifice having varying areas for controlling communication between the said two passages.

13. In an internal combustion engine having a chamber, and a cylinder, and an admission manifold, an exhaust valve, a positively operated imperforate intake valve, said engine provided with a passage for conveying an explosive charge from the admission manifold to the cylinder, a second passage maintaining communication with the said first passage through an aperture having varying areas, said aperture being adjacent the said intake valve.

14. In an internal combustion engine having a cylinder and a positively operated imperforate intake valve, an intake port adjoining said valve composed of two passages so arranged as to be in communication with each other through an opening in the wall of the inner passage.

15. An internal combustion engine including a cylinder having a multiplicity of valves therein, a passage for conveying a charge to said cylinder, one of said valves controlling the entrance of fluid to said cylinder, a second passage terminating in a sleeve substantially concentric with said valve and opening into the first passage, said sleeve being so constructed and arranged as to co-act with the valve for reducing the area of the opening between the said two passages as the valve closes.

16. In an internal combustion engine comprising two or more cylinders each having two or more valves operable therein, an intake port associated with one of said valves in each cylinder, a passage for maintaining communication between the said intake ports of two or more cylinders, a second passage terminating in a sleeve substantially concentric with the valve for each of said intake ports, said sleeves being so constructed and arranged adjacent each of said ports as to co-act with the valve for reducing the area of the opening between the said two passages as the valve closes.

17. In an internal combustion engine comprising two or more cylinders each having two or more valves operable therein, an intake port associated with one of said valves in each cylinder, a passage associated with each of said ports for conveying the charge to each of said cylinders, a second passage terminating in a sleeve substantially concentric with the valve in each of two or more of said ports, said sleeves being so constructed and arranged adjacent each of said ports as to co-act with the valve for reducing the area of the opening between the said two passages as the valve closes.

JOSEPH REX DAVIS.